United States Patent Office 3,253,662
Patented May 31, 1966

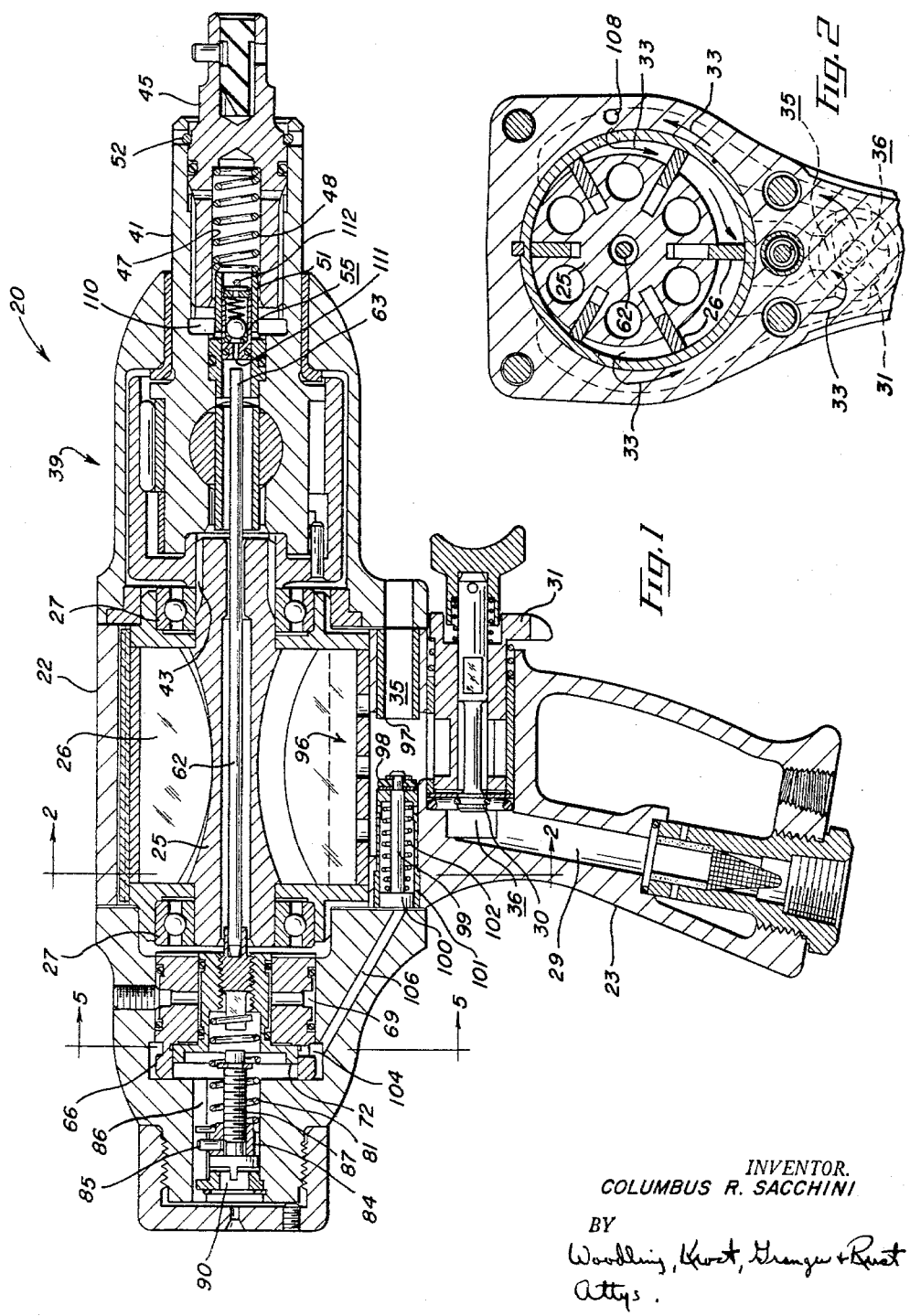

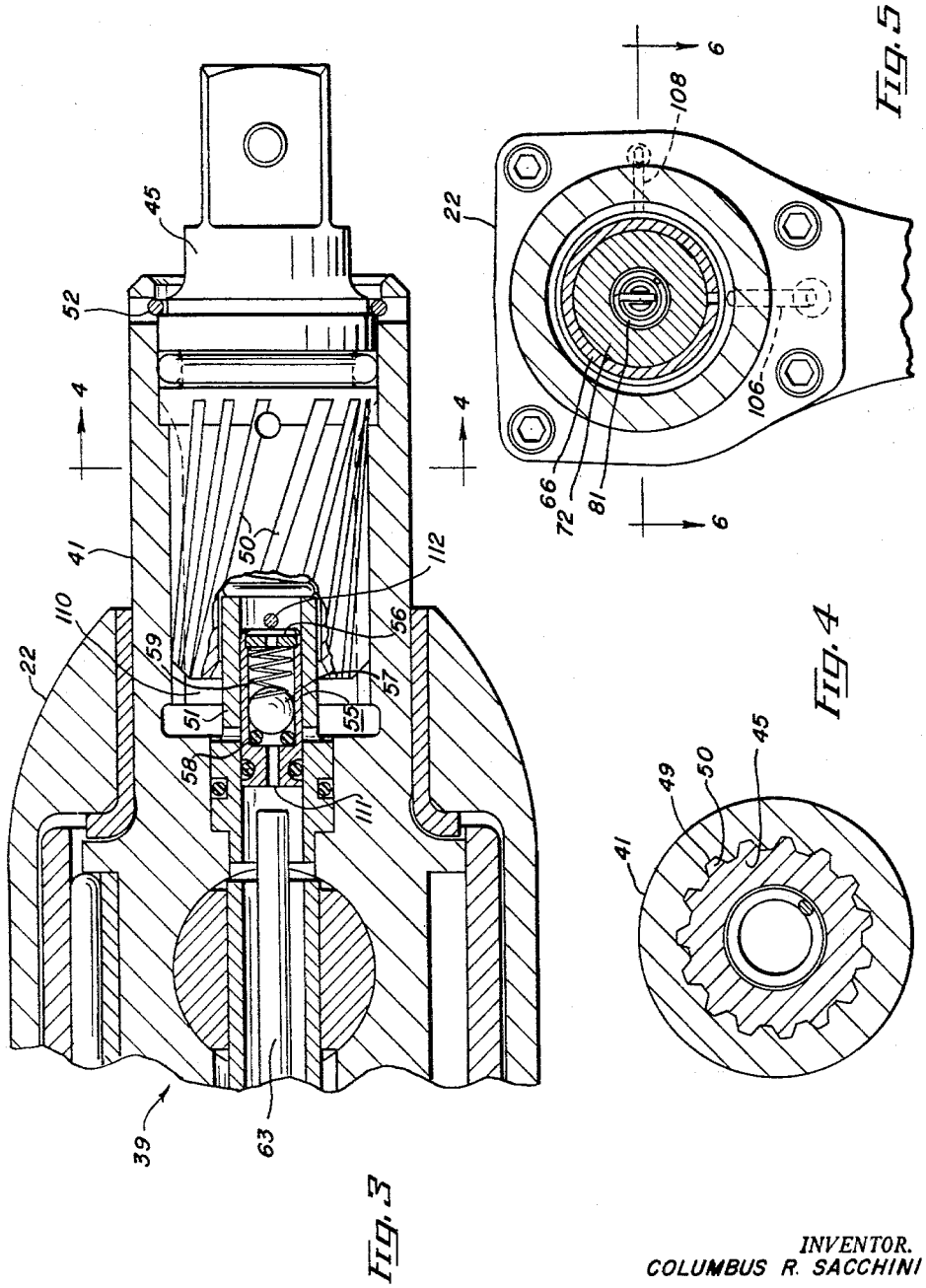

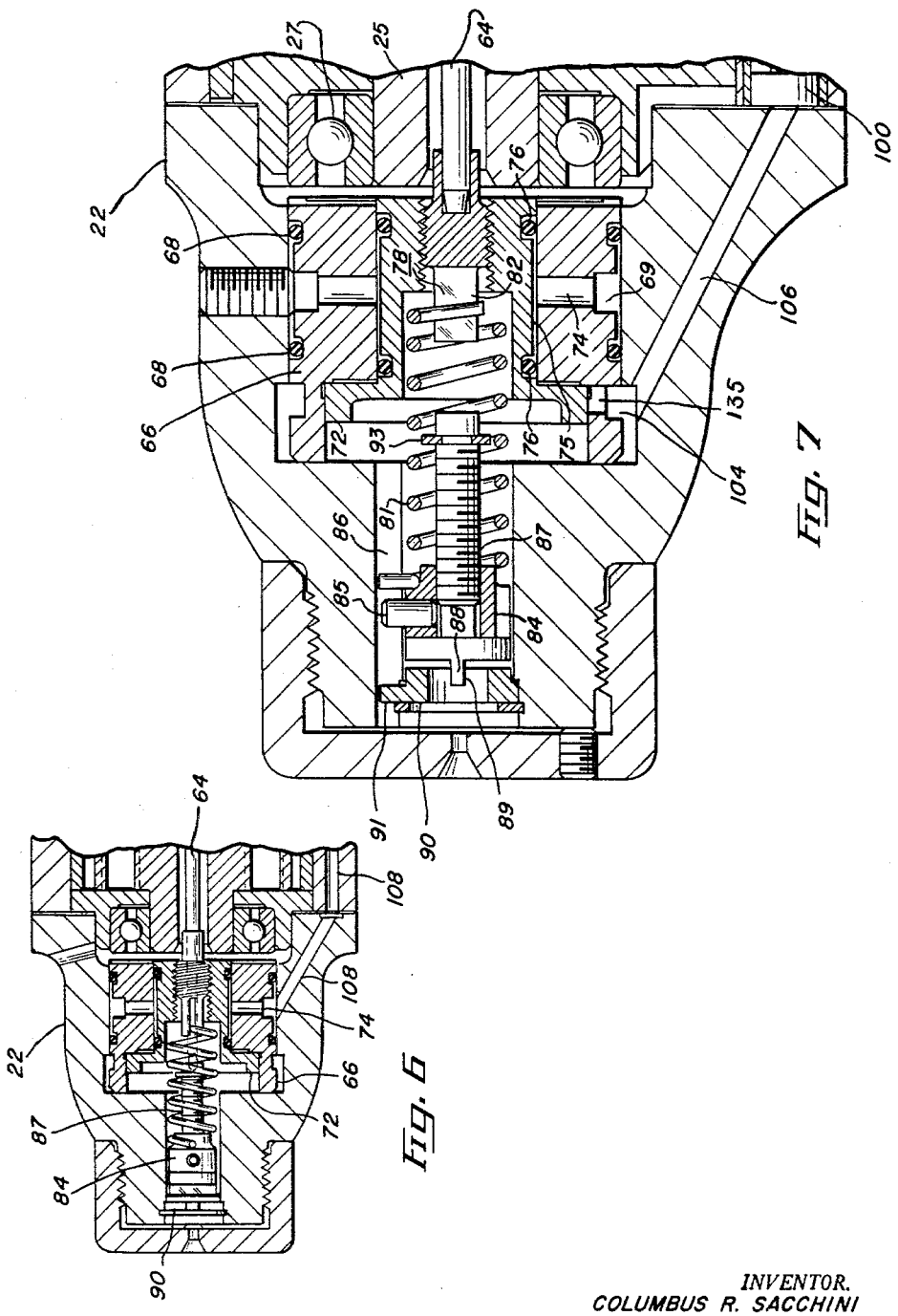

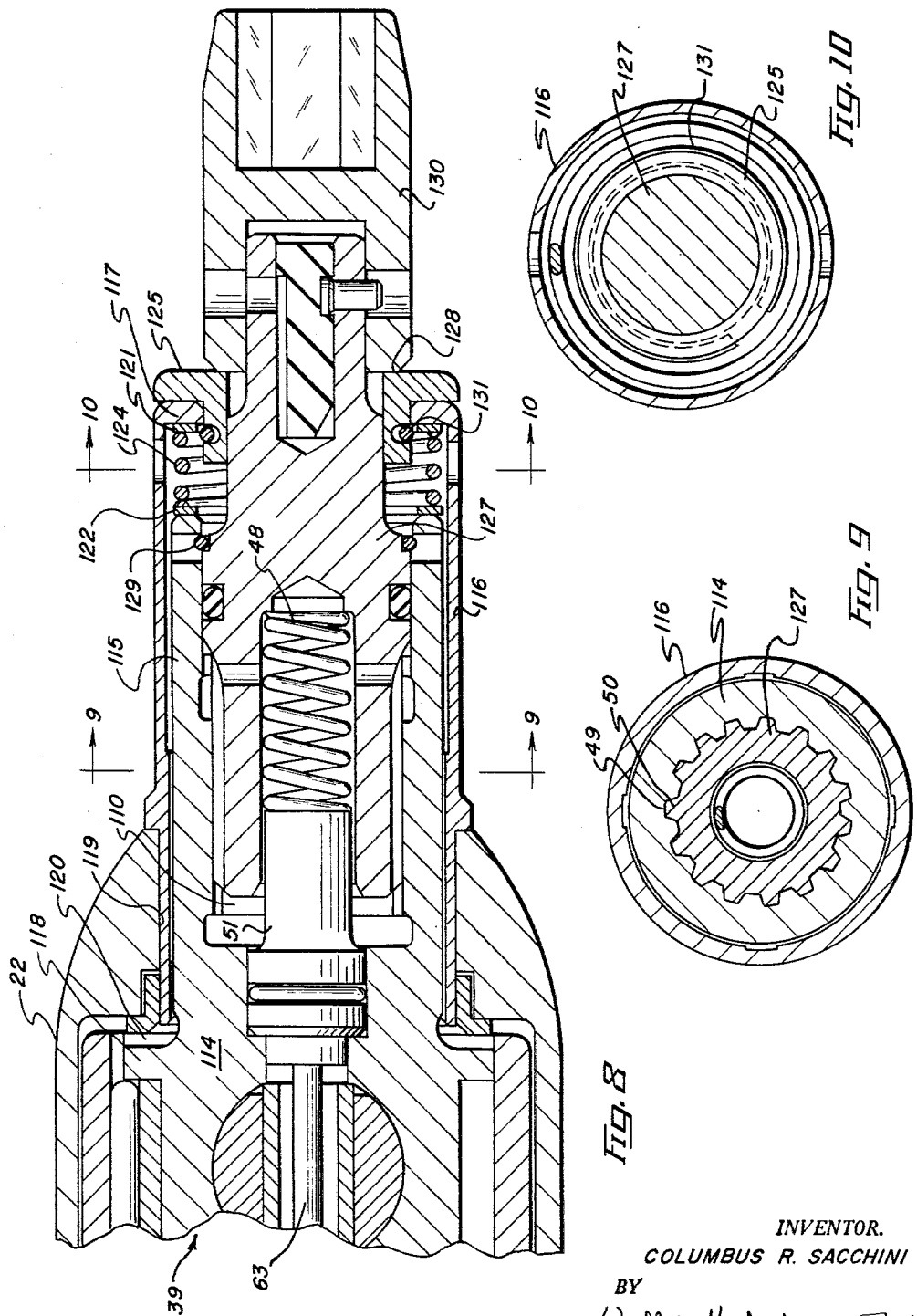

3,253,662
CONTROLLED TORQUE TOOL
Columbus R. Sacchini, Willowick, Ohio, assignor, by mesne assignments, to Cooper-Bessemer Corporation, Euclid, Ohio, a corporation of Ohio
Filed Oct. 20, 1961, Ser. No. 146,532
16 Claims. (Cl. 173—12)

This application is a continuation-in-part of application of U.S. Serial No. 114,224, filed June 1, 1961, now abandoned.

The invention relates in general to steady or intermittent torque type tools and more particularly to such tools of this general class wherein provision is made to prevent the tool from tightening a member more than a predetermined amount.

An object of the present invention is to provide a fluid driven tool of the type described with provision for limiting the torque which can be applied to a work member which includes a connection between the drive and driven members which permits relative axial movement between the two which in turn causes closing of the exhaust port of the fluid driven tool and stopping of the tool.

Another object of the invention is to provide a tool of the type described wherein relative movement is effected between a drive part and a driven part which movement is effecting to interrupt the power path means supplying power through the drive motor.

Another object of the invention is to provide a tool of the type described wherein relative movement is affected between a drive part and a driven part which movement is amplified by hydraulic amplification means which movement is effective to interrupt the power path means supplying power through the drive motor.

Another object of the invention is to provide a tool of the type described wherein relative movement is effected between a drive part and a driven part upon the reaching of a predetermined torque which movement is effective to open a control valve and permit flow of fluid from the inlet side of a fluid drive motor to close an exhaust valve with subsequent stopping of the drive motor.

Another object of the invention is to provide a fluid driven tool of the type described wherein a driven part is adapted to apply torque to a work member and upon the application of a predetermined torque to the work member a signal is transmitted to cause closing of the exhaust of the fluid driven tool with resultant stopping of the same.

Another object of the invention is to provide a tool of the type described wherein hydraulic fluid means are provided between a drive and driven part and upon sufficient resistance to rotation being met by the driven member relative movement is effected between the drive and driven members through the hydraulic fluid means which movement through control means effects stopping of the tool.

Another object of the present invention is to provide a tool of the type described which is not affected by axial pressure or force exerted against a driven member which engages the work, for example by a workman.

Another object of the present invention is to provide a tool of the type described wherein a drive and driven member are connected together in such fashion that the drive member may move axially relative to the driven member, but the driven member remains in an axially fixed position.

Other objects and a fuller understading of this invention may be had by referring to the following description and claims, taken in conjunction with the accompanying drawings, in which:

FIGURE 1 is a side elevational view in section of a tool constructed in accordance with the teachings of the present invention;

FIGURE 2 is a view taken generally along the line 2—2 of FIGURE 1;

FIGURE 3 is an enlarged view of the drive end of the tool;

FIGURE 4 is a view taken generally along the line 4—4 of FIGURE 3;

FIGURE 5 is a view taken generally along the line 5—5 of FIGURE 5;

FIGURE 7 is an enlarged view of the rear end of the tool;

FIGURE 8 is an enlarged view of the drive end of a modification of the tool shown in FIGURES 1 and 3;

FIGURE 9 is a view taken generally along the line 9—9 of FIGURE 8; and

FIG. 10 is a view taken generally along the line 10—10 of FIGURE 8.

The teachings of the present invention have been incorporated into what is generally referred to in the art as a rotary type impact clutch, however, it will be obvious to those skilled in the art that the teachings of the present invention are susceptible of incorporation into many types of tools which are not necessarily of the impact type. The device into which the present invention has been incorporated is indicated generally at 20 and includes a housing 22 which is formed with a pistol grip type handle 23 and contained within the housing 22 is an air motor which comprises the usual rotor 25 having a plurality of blades 26 and mounted for rotation upon bearings 27. Air under pressure is introduced into the air motor by way of a passage 29 in the pistol grip handle 23 and at the discretion of an operator of the device, is admitted into the air motor proper by means of a finger actuated valve 30. A reversing valve mechanism 31 (FIGURES 1 and 2) is also provided and depending upon the position of this valve mechanism 31, the direction of rotation of the rotor may be changed. In the position shown in FIGURE 2, air under pressure passes into and through the air motor in the direction of the arrows 33 in a manner well known to those skilled in the art, and the rotor 25 is caused to rotate in a clockwise direction as viewed in FIGURE 2. Exhausted air exits the air motor through exhaust means 35. The passage on the inlet side of the air motor 36 may be referred to as air inlet means.

An impacting mechanism indicated generally at 39 and located in the right end of the housing 22 is adapted to drive a drive or spindle member 41. The details of construction of the impacting mechanism 39 are not necessarily important to a proper understanding and disclosure of the present invention, however, the details are similar to the details of the impacting mechanism shown and disclosed in United States patent application Serial No. 51,132, filed August 22, 1960, now Patent No. 3,102,621. The rotor 25 drives the impacting mechanism in a rotary direction through the medium of a splined connection 43. The right end of the spindle 41 is provided with an opening, the walls of which are provided with a plurality of female type helical splines 49. Positioned in the opening in the spindle member 41 is a driven member 45 which is provided with a plurality of male type helical splines 50 on the outer surface thereof which interfit with the female helical splines on the spindle member 41. This helical spline connection serves to connect the spindle and driven members together whereby relative axial movement may be effected between the two members. The left end of the driven member 45 has been drilled to provide wall means 47 and a spring member 48 is positioned in the primary cylinder formed by the wall means 47 and bears against the driven member 45 at one end and at the other end against the end of a secondary cylinder 51. A ring 52 prevents the driven member 45 from falling or traveling completely out of the opening in the spindle member 41. A piston assembly 55 is positioned in the secondary cylinder 51 and is adapted for back and forth movement therein. The piston assembly 55 includes an end member 56 which has an axial opening therethrough and the opposite end of the piston assembly is also provided with an axial opening. The axial opening at the left end is closed by means of a ball check 57 and sealing member 58 held in position by the action of a spring 59 which extends between the ball check 57 and the end member 56. A push rod 62 extends axially through the impact clutch as indicated in FIGURE 1 and is provided with first and second end portions 63 and 64 respectively. The first end portion 63 is adapted to be engaged by the piston assembly 55 in a manner which will be described in more detail in a discussion of the operation of the device. The second end portion 64 of the push rod 62 is located at the left end of the device as shown in FIGURE 1.

Control valve means are located in the left end of the housing 22 and the control valve means includes a control piston sleeve 66 which has its outer walls spaced from the bore within which it resides and this along with first and second O-rings 68 serves to define a chamber 69. A control piston 72 is positioned within the sleeve 66 and is adapted to move between what may be referred to as open and closed positions. The full line position of FIGURE 1 may be considered the closed position. Passageway means 74 serve to provide communication between the chamber 69 and a chamber 75 which is formed between the outer walls of the control piston 72 and the inner walls of the sleeve 66. The axial extent of this chamber is defined by two O-rings 76. A rod adjustment screw 78 is threadably secured to the control piston 72 as shown and the second end portion 64 of the push rod 62 is operatively connected thereto by residing in an opening in the right end of the rod adjustment screw. As a result of this connection, movements of the push rod 62 to the left are also transmitted to the control piston 72. Movement of the control piston 72 to the left as seen in FIGURE 1 is resisted by the action of a spring member 81 which at one end surrounds an extension 82 on the left end of the rod adjustment screw 78 and at the other end engages an adjusting screw guide 84. The adjusting screw guide 84 is maintained from rotation by means of a pin 85 extending thereinto and also into a slot 86. An adjusting screw 87 extends through the adjusting screw guide 84. A projection 88 on the left end of the adjusting screw 87 fits into a slot 89 on an adjusting screw lock 90 which in turn is maintained from rotation by a lug 91 residing in slot 86. The threaded connection between the adjusting screw guide and the adjusting screw determines the position of the adjusting screw guide relative to the rod adjustment screw 78 which in turn determines the force exerted by the spring member 81 on the control piston 72 tending to maintain the same in closed position. A stop member 93 is provided on the adjusting screw 87 to limit the threaded movement of the adjusting screw guide thereon.

An exhaust valve 96 is located at the exhaust means 35 and is movable between open and closed positions to close the exhaust means. In the position shown in FIGURE 1, the exhaust valve 96 is in its open position which permits flow of air under pressure from the air inlet means 36 through the air motor and out the air exhaust means 35. When the exhaust valve 96 moves to the closed position, this prevents air flow through the air motor with a resultant stalling or stopping of the same. The exhaust valve 96 includes a seat 97 and a valve member 98 which is movable against the seat 97 to close the exhaust. The valve member includes a stem 99 connected to a piston 100 which is adapted to move in a sleeve 101. A spring 102 tends to maintain the valve in the open position as seen in FIGURE 1, and the exertion of pressure against the left end of piston 100 which is sufficient to overcome the force of spring 102 serves to close the valve. Wall means 104 serve to define an annular chamber adjacent to control piston 72 and when the control piston 72 moves to the left against the urging of spring member 81, air travels by the control piston 72 into chamber 104, through 135 and through a passageway 106 to act upon piston 100 which in turn serves to close the exhaust valve 96. Air is introduced to the chamber 69 from the air inlet means 36 through a passage 108 which is best seen in FIGURES 2, 5 and 6.

The operation of the device may be described by assuming that the driven member 45 is being utilized to turn down a nut. With the reversing valve mechanism 31 in the position shown in FIGURE 2 and with the valve 30 depressed by the finger of an operator of the device, the air motor is caused to rotate in the clockwise direction as seen in FIGURE 2 with the result that the spindle 41 is driven through the medium of the impacting mechanism 39 which drives the driven member 45 which in turn tightens the nut. When a predetermined resistance to rotation is encountered by the nut and the driven member 45 which is attached thereto, the driven member tends to slow down or stop turning whereas the spindle member tends to rotate thereby causing relative axial movement between the spindle and driven member. The wall means 47 which define the primary cylinder in the driven member 45 as well as the space between the extreme left end of the driven member and the left end of the wall of the bore within which the driven member resides and indicated by the numeral 110 as well as the interior of the piston assembly 55 between the end member 56 and the ball check 57 are filled with hydraulic fluid. As a result, relative axial movement between the spindle and driven member serves to reduce the volume in the primary cylinder 47 with the resultant exertion of a hydraulic force on the right end of the piston assembly 55. The movement of the piston assembly to the left is amplified over the relative movement between the spindle and driven member because the primary cylinder is larger than the secondary cylinder 51. Movement of the piston assembly 55 causes the assembly to engage the first tnd portion 63 of the push rod 62 and move the push rod to the left which in turn causes movement of the control piston 72 to the left which permits flow of air under pressure through passage 108, chambers 69 and 104 and through passageway 106 to act upon the piston 100 which in turn closes the exhaust valve 96. When the exhaust valve 96 is closed there is no pressure difference between the air inlet means 36 and air exhaust means 35 and as a result no air flow, and the air motor stalls or stops. When the air motor stops, the operator of the device then appreciates that the predetermined torque has been applied to the nut or work member and as a result releases the valve 30 which is actuated by the operator's finger. As a result of this, the air pressure in the air inlet means 36 quickly drops with a resultant closing of the control piston 72 and opening of the exhaust valve 96. The spring member 48 serves to return the driven member 45 to the position shown in FIGURE 1 relative to the spindle member 41.

In the event it is desired to increase the torque applied to the work member which is being acted upon, it is only necessary to rotate the adjusting screw relative to the adjusting screw guide which in turn causes a compression of spring member 81 with the result that a greater force must be exerted on the push rod 62 by action of the piston assembly 55 before the exhaust valve 96 is caused to be closed by the action which has been described hereinabove.

The construction of the piston assembly 55 is primarily for the purpose of assuring that the device is completely filled with hydraulic fluid. In filling the device the piston assembly 55 is not assembled in the position shown in FIGURE 1, but rather is removed and the primary and secondary cylinder and space 110 and other spaces are what may be referred to as overfilled with hydraulic fluid. The piston assembly 55 is then moved to the position shown in FIGURE 1 by inserting a rod through opening 111 which moves the ball check 57 off of its seat with resultant passage of hydraulic fluid through the opening 111 to the left until movement of the piston assembly to the right is prohibited by engagement with a roll pin 112. When this has been done, the device is properly located in its initial setting with the result that the operation of the device as described hereinabove can be accomplished.

FIGURE 8 is an enlarged view of the drive end of a modification of the tool shown in FIGURES 1 and 3. It has been found in the use of the device shown in FIGURES 1 and 3 that although the operation is entirely satisfactory, it is possible under some working conditions of the device that an operator may place a disproportionate amount of force on the driven member in a direction tending to move the driven member axially toward the housing or in other words, tending to move it into the housing. In this instance, this may change the shut off point which may be sooner, for example, than a nut has been turned down to a desired predetermined tightness. The modification of the device of the present invention as shown in FIGURE 8 obviates this possibility. Where similar structure is shown, the same reference numerals have been utilized, as in FIGURES 1 through 7, and where different structure results, new reference numerals have been applied.

The impact spindle in the device of FIGURE 8 has been indicated by the reference numeral 114, and this, as in the device of FIGURES 1 and 3, is driven by the impacting mechanism 39. The housing 22 is provided with an opening 119 at the right end thereof and an annular sleeve member 116 is secured in this opening and extends therefrom. The outer end of the annular sleeve member 116 is provided with an inturned flange 117. The impact spindle 114 is provided with an end portion 115 which resides within the annular sleeve member 116 and terminates short of the inturned flange 117 which will be seen in FIGURE 8. First and second annular thrust members 121 and 122 are located respectively adjacent the inturned flange 117 and the end portion 115 of the impact spindle 114. A thrust spring 124 extends between and engages the first and second thrust member 121 and 122 respectively at opposed ends thereof to urge the impact spindle 114 axially away from the outer end of the annular sleeve member 116, or in other words, into the housing 22. A spacer member 125 extends into the outer end of the annular sleeve member 116 and also extends around the inturned flange 117. A driven member 127 which is quite similar to driven member 45 is provided and a portion of this driven member extends through the spacer member 125. An insert member 130 is connected to the end of the driven member and provides abutment means 128 for the driven member which are engageable with the spacer member to prevent axial movement of the driven member 127 toward the housing 22. A ring 129 prevents movement of the driven member 127 in the other axial direction. The spindle and driven member are connected together by the splined connection which is the same as the splined connection 49 and 50 in FIGURES 1 and 3. A spacer member clip 131 is provided which serves to maintain the spacer member in position. It will also be noted that the left end of the impact spindle 114 is provided with a shoulder 118 which permits the impact spindle to move slightly to the right because of the space indicated at 120. As a result of this construction, the driven member is permitted to rotate, however, it is restrained from movement in an axial direction either toward or away from the housing 22. The impact spindle in addition to its rotative movement is also capable of moving in an axial direction.

The operation of this device is the same as the operation of the device shown in FIGURES 1 through 7 with the exception that when the driven member meets sufficient resistance to rotation, for example in the tightening of a nut, since it is not capable of moving axially, the only part that moves axially is the impact spindle 114 (to the right as seen in FIGURE 8) with subsequent actuation of the control means which shuts off the air motor. It will thus be seen that the device illustrated in this modification of the invention is independent of outside influences which tend to exert an axial force on the driven member, for example by an operator of the device.

As a result of the construction which has been described in detail hereinabove, it will be seen that a tool has been provided which produces a controlled amount of torque on a work member. This is in part accomplished by the provision of a connection between the drive and driven members which permits relative axial movement between the two when a predetermined torque has been reached which in turn actuates control means which closes the exhaust port of the fluid driven tool and stopping of the same. The movement which is effected between the drive and the driven part may be said to interrupt the power path means which supplies power through the drive motor. The connection between the spindle or drive member and the driven member in part comprises a hydraulic connection which provides an amplified movement whereby power through the drive motor is interrupted when a predetermined amount of torque has been applied to a work member. A helical spline type of connection between the drive and driven members produces a reliable axial movement when a predetermined amount of torque has been applied to a work member and this movement actuates control means which closes the exhaust of the air type driving motor. It will also be seen from a review of the detailed description given hereinabove, that the other objects referred to have been accomplished and a new and novel control torque type tool or wrench has been provided. In order to effect removal of the nut referred to above, or a similar work member, it is only necessary to reverse the position of the valve mechanism 31 which causes a reversal in the rotation of the rotor 25 and member 45.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A tool of the class described including in combination a fluid motor having fluid inlet means and fluid exhaust means, a spindle driven by said motor, a driven member, helical spline means connecting said spindle and driven member together whereby upon sufficient resistance to rotation being met by said driven member relative axial movement is effected between said driven member and said spindle, exhaust valve means, conduit means extending between said fluid inlet means and said fluid exhaust means, control valve means in said conduit means and movable between open and closed positions, said control valve means in open position permitting flow through said conduit means and closing of said exhaust valve means and in closed postion prohibiting flow through said conduit means and opening of said exhaust valve means, hydraulically amplified axial movement means actuated by relative movement between said driven member and said spindle, means extending between said hydraulically amplified axial movement means and said control valve means to open said control valve means upon actuation of said hydraulically amplified axial movement means with subsequent closing of said exhaust valve means and stalling of said fluid motor.

2. A tool of the class described including in combination, a fluid motor having a fluid inlet means and fluid exhaust means, a spindle driven by said motor, a driven member, helical spline means connecting said spindle and driven member together whereby upon sufficient resistance to rotation being met by said driven member relative axial movement is effected between said driven member and said spindle, exhaust valve means, conduit means extending between said fluid inlet means and said fluid exhaust means, control valve means in said conduit means and movable between open and closed positions, said control valve means in open position permitting flow through said conduit means and closing of said exhaust valve means and in closed position prohibiting flow through said conduit means and opening of said exhaust valve means, relative axial movement between said driven member and said spindle causing opening of said control valve means with subsequent closing of said exhaust valve means and stalling of said fluid motor.

3. A tool of the class described, including in combination, a fluid motor having fluid inlet and exhaust means, a spindle driven by said motor, a driven member, helical spline means connecting said spindle and driven member together whereby upon sufficient resistance to rotation being met by said driven member relative axial movement is effected between said driven member and said spindle, exhaust valve means for opening and closing said fluid exhaust means and control means actuated upon relative axial movement between said driven member and said spindle to effect closing of said exhaust valve means and stopping of said fluid motor.

4. A tool of the class described including in combination a fluid motor having fluid inlet means and fluid exhaust means, a spindle driven by said motor, a driven member, means connecting said spindle and driven member together whereby upon sufficient resistance to rotation being met by said driven member relative axial movement is effected between said driven member and said spindle, exhaust valve means for opening and closing said fluid exhaust means, and control means actuated upon relative axial movement between said driven member and said spindle to effect closing of said exhaust valve means and stopping of said fluid motor.

5. A tool of the class described including in combination a fluid motor having fluid inlet means and fluid exhaust means, a spindle driven by said motor, a driven member, means connecting said spindle and driven member together whereby upon sufficient resistance to rotation being met by said driven member relative axial movement is effected between said driven member and said spindle, exhaust valve means, conduit means extending between said fluid inlet means and said fluid exhaust means, control valve means in said conduit means and movable between open and closed positions, said control valve means in open position permitting flow through said conduit means and closing of said exhaust valve means and in closed position prohibiting flow through said conduit means and opening of said exhaust valve means, hydraulically amplified axial movement means actuated by relative axial movement between said driven member and said spindle, means extending between said hydraulically amplified axial movement means and said control valve means to open said control valve means upon actuation of said hydraulically amplified axial movement means with subsequent closing of said exhaust valve means and stalling of said fluid motor.

6. A tool of the class described including in combination a fluid motor having fluid inlet means and fluid exhaust means, a spindle driven by said motor, a driven member, means connecting said spindle and driven member together whereby upon sufficient resistance to rotation being met by said driven member relative axial movement is effected between said driven member and said spindle, exhaust valve means, conduit means extending between said fluid inlet means and said fluid exhaust means, control valve means in said conduit means and movable between open and closed positions, said control valve means in open position permitting flow through said conduit means and closing of said exhaust valve means and in closed position prohibiting flow through said conduit means and opening of said exhaust valve means, relative axial movement between said driven member and said spindle causing opening of said cotrol valve means with subsequent closing of said exhaust valve means and stalling of said fluid motor.

7. A tool of the class described including in combination a motor having fluid inlet means and fluid exhaust means, a spindle driven by said motor, a driven member, means connecting said spindle and driven member together whereby upon sufficient resistance to rotation being met by said driven member relative axial movement is effected between said driven member and said spindle, an exhaust valve in said exhaust means, and control means actuated upon relative axial movement between said driven member and said spindle to cause closing of said exhaust valve and stopping of said motor.

8. A power driven wrench including in combination a motor, power path means supplying power through said motor to drive same, a spindle driven by said motor, a driven member, hydraulic fluid means connecting said spindle and driven member together whereby upon sufficient resistance to rotation being met by said driven member relative movement is effected between said driven member and said spindle, and control means actuated by said relative movement to interrupt said power path means and stop said motor.

9. A power driven wrench including in combination a motor, power path means supplying power through said motor to drive same, a spindle driven by said motor, a driven member, hydraulic fluid means tending to prevent movement between said spindle and said driven member and upon sufficient resistance to rotation being met by said driven member relative movement is effected between said driven member and said spindle, and control means actuated by said relative movement to interrupt said power path means and stop said motor.

10. A rotary impact clutch including in combination a housing, an air motor in said housing having an air inlet and an air exhaust, an impacting mechanism driven by said motor in a rotary direction, an impact spindle driven by said impacting mechanism, a driven member, a helical spline connection connecting said impact spindle and said driven member together whereby relative axial movement is obtained between the two when said driven member meets sufficient resistance to rotation, wall means in said driven member defining the walls of a primary cylinder, a secondary cylinder having an end portion in communication with said primary cylinder and being smaller than said primary cylinder, a piston in said secondary cylinder, axial movement of said driven member and said primary cylinder causing an amplified movement of said piston, a valve located at said air exhaust and movable to open and close said exhaust, spring means normally maintaining said valve in open position, conduit means leading from said air inlet to said valve, a control valve located in said conduit means, a control rod extending between said piston and said control valve, movement of said piston causing movement of said control rod and opening of said control valve, spring means for closing said control valve, said control valve in open position permitting passage of air from said air inlet to said valve to close same and stop said air motor.

11. A power wrench including in combination a housing, an air motor in said housing having an air inlet and an air exhaust, a spindle driven by said air motor, a driven member, a helical spline connection connecting said spindle and said driven member together whereby relative axial movement is obtained between the two when said driven member meets sufficient resistance to rotation, wall means in said driven member defining the walls of a primary cylinder, a secondary cylinder having an end portion in communication with said primary cylinder and being smaller than said primary cylinder, a piston in said secondary cylinder, axial movement of said driven member and said primary cylinder causing an amplified movement of said piston, a valve located at said air exhaust and movable to open and close said exhaust, means normally maintaining said valve in open position, conduit means leading from said air inlet to said valve, a control valve located in said conduit means, a control rod extending between said piston and said control valve, movement of said piston causing movement of said control rod and opening of said control valve, means for closing said control valve, said control valve in open position permitting passage of air from said air inlet to said air exhaust valve to close same and stop said air motor.

12. A power driven wrench including in combination a motor, power path means supplying power through said motor to drive same, a spindle driven by said motor, a driven member, means mounting said driven member for only rotative movement, hydraulic fluid means connecting said spindle and driven member together whereby upon sufficient resistance to rotation being met by said driven member movement of said spindle is effected, and control means actuated by said movement of said spindle to interrupt said power path means and stop said motor.

13. A tool of the class described including in combination a fluid motor having fluid inlet and exhaust means, a spindle driven by said motor, a driven member, helical spline means connecting said spindle and driven member together whereby upon sufficient resistance to rotation being met by said driven member, said spindle moves axially relative to said driven member, exhaust valve means for opening and closing said fluid exhaust means and control means actuated upon axial movement of said spindle to effect closing of said exhaust valve means and stopping of said fluid motor.

14. A tool of the class described including in combination a fluid motor having fluid inlet and exhaust means, a spindle driven by said motor, a driven member, means mounting said driven member for rotative movement and preventing axial movement thereof, helical spline means connecting said spindle and driven member together whereby upon sufficient resistance to rotation being met by said driven member, said spindle moves axially relative to said driven member, exhaust valve means for opening and closing said fluid exhaust means and control means actuated upon axial movement of said spindle to effect closing of said exhaust valve means and stopping of said fluid motor.

15. A torque controlled tool including in combination a housing, wall means defining an opening at one end portion of said housing, an air motor in said housing having an air inlet and an air exhaust, an impacting mechanism driven by said motor in a rotary direction, an impact spindle driven by said impacting mechanism, an annular sleeve member secured to and extending from said opening in said housing and having an inturned flange at its outer end, said impact spindle having an end portion residing within said annular sleeve member and terminating short of said inturned flange, first and second annular thrust members respectively located adjacent said inturned flange and said end portion of said impact spindle, a spring extending between said first and second thrust members to urge said impact spindle axially away from said outer end of said annular sleeve member, a spacer member extending into said outer end of said annular sleeve member around said inturned flange, a driven member, abutment means connected to said driven member and engaging said spacer member to prevent axial movement of said driven member toward said housing, a helical spline connection connecting said impact spindle and said driven member together whereby said impact spindle moves axially toward said outer end of said annular sleeve member when said driven member meets sufficient resistance to rotation, wall means in said driven member defining the walls of a primary cylinder, a secondary cylinder having an end portion in communication with said primary cylinder, a piston in said secondary cylinder, axial movement of said impact spindle toward said outer end of said annular sleeve member causing an amplified movement of said piston, a valve located at said air exhaust and movable to open and close said exhaust, spring means normally maintaining said valve in open position, conduit means leading from said inlet to said valve, a control valve located in said conduit means, a control rod extending between said piston and said control valve, movement of said piston causing movement of said control rod and opening of said control valve, spring means for closing said control valve, said control valve in open position permitting passage of air from said air inlet to said valve to close same and stop said air motor.

16. A torque controlled tool including in combination a housing, wall means defining an opening at one end portion of said housing, an air motor in said housing having an air inlet and an air exhaust, an impacting mechanism driven by said motor in a rotary direction, an impact spindle driven by said impacting mechanism, an annular sleeve member secured to and extending from said opening in said housing, said impact spindle having an end portion residing within said annular extension member, a spring acting between said sleeve member and impact spindle to urge said impact spindle axially away from the outer end of said annular sleeve member, a driven member, abutment means connected to said driven member and engaging said sleeve member to prevent axial movement of said driven member toward said housing, a helical spline connection connecting said impact spindle and said driven member together whereby said impact spindle moves axially toward said outer end of said annular sleeve member when said driven member meets sufficient resistance to rotation, piston and cylinder means formed by said impact spindle and said driven member, axial movement of said impact spindle toward said outer end of said annular sleeve member causing movement of said piston means, a valve located at said air exhaust and movable to open and close said exhaust, spring means normally maintaining said valve in open position, conduit means leading from said air inlet to said valve, a control valve located in said conduit means, a control rod extending between said piston means and said control valve, movement of said piston means causing movement of said control rod and opening of said control valve, spring means for closing said control valve, said control valve in open position permitting passage of air from said air inlet to said valve to close same and stop said air motor.

References Cited by the Examiner

UNITED STATES PATENTS

| | | | |
|---|---|---|---|
| 2,484,364 | 10/1949 | Whitledge | 121—35 |
| 2,527,658 | 10/1950 | Sinclair | 192—56 |
| 2,619,815 | 12/1952 | Nardone | 192—56 |
| 2,708,993 | 5/1955 | Munschauer | 192—56 |
| 2,825,353 | 3/1958 | Voytech | 121—11 |
| 2,860,603 | 11/1958 | Heidler | 121—34 |
| 2,905,149 | 9/1959 | Swanson | 121—11 |
| 2,923,306 | 2/1960 | Michell | 121—35 |
| 2,964,151 | 12/1960 | Eckman | 121—33 |
| 2,977,931 | 4/1961 | Schott | 121—33 |
| 3,049,098 | 8/1962 | Inoue | 121—33 |
| 3,059,620 | 10/1962 | Eckman | 121—33 |
| 3,082,742 | 3/1963 | Vilmerding et al. | 173—12 |

BROUGHTON G. DURHAM, *Primary Examiner.*

KARL J. ALBRECHT, *Examiner.*

J. LABOWSKI, L. P. KESSLER, *Assistant Examiners.*